US009952882B2

(12) United States Patent
Kuscher et al.

(10) Patent No.: US 9,952,882 B2
(45) Date of Patent: Apr. 24, 2018

(54) INTEGRATED TASK ITEMS LAUNCHER USER INTERFACE FOR SELECTING AND PRESENTING A SUBSET OF TASK ITEMS BASED ON USER ACTIVITY INFORMATION

(71) Applicant: Google Inc., Mountain View, CA (US)

(72) Inventors: Alexander Friedrich Kuscher, San Francisco, CA (US); Katie Jane Messerly, Seattle, WA (US); Jennifer Shien-Ming Chen, San Francisco, CA (US)

(73) Assignee: Google LLC, Mountain View, CA (US)

( * ) Notice: Subject to any disclaimer, the term of this patent is extended or adjusted under 35 U.S.C. 154(b) by 328 days.

(21) Appl. No.: 14/525,133

(22) Filed: Oct. 27, 2014

(65) Prior Publication Data

US 2016/0117082 A1 Apr. 28, 2016

(51) Int. Cl.
| | |
|---|---|
| *G06F 3/048* | (2013.01) |
| *G06F 17/30* | (2006.01) |
| *G06F 3/00* | (2006.01) |
| *G06F 9/445* | (2018.01) |
| *H04L 29/08* | (2006.01) |
| *G06F 9/44* | (2018.01) |

(52) U.S. Cl.
CPC ............. *G06F 9/445* (2013.01); *G06F 3/048* (2013.01); *G06F 8/38* (2013.01); *H04L 67/22* (2013.01)

(58) Field of Classification Search
CPC ............ G06F 3/048; G06F 17/30; G06F 3/00; G06Q 30/00; H04L 29/00; H04L 67/22
See application file for complete search history.

(56) References Cited

U.S. PATENT DOCUMENTS

| | | | |
|---|---|---|---|
| 7,712,049 B2 | 5/2010 | Williams et al. | |
| 8,788,946 B2 | 7/2014 | Hegde et al. | |
| 9,264,437 B1* | 2/2016 | Tran ........................ | H04L 63/10 |
| 2002/0010625 A1* | 1/2002 | Smith .................... | G06Q 30/02 |
| | | | 705/14.52 |
| 2006/0167757 A1* | 7/2006 | Holden .................. | G06Q 30/06 |
| | | | 705/27.2 |
| 2006/0218499 A1* | 9/2006 | Matthews .......... | G06F 17/30616 |
| | | | 715/765 |
| 2008/0059444 A1* | 3/2008 | Singh ................ | G06F 17/30389 |
| 2008/0276179 A1* | 11/2008 | Borenstein ............. | G06Q 10/10 |
| | | | 715/736 |
| 2010/0030717 A1* | 2/2010 | Agarwal ................ | G06Q 30/02 |
| | | | 706/46 |
| 2010/0125911 A1* | 5/2010 | Bhaskaran ............. | G06Q 10/10 |
| | | | 726/23 |

(Continued)

*Primary Examiner* — Hugo Molina
(74) *Attorney, Agent, or Firm* — McDermott Will & Emery LLP

(57) ABSTRACT

Methods, systems, and machine-readable media include identifying a plurality of task items associated with a user. The plurality of task items includes a plurality of task types. They also include selecting a subset of the plurality of task items based on user activity information. The subset of task items includes at least two different task types. They also include providing a launcher user interface for display to the user on a computing device. The launcher user interface includes a plurality of elements corresponding to the selected subset of task items arranged on a single surface. The plurality of elements is selectable to launch respective applications associated with the corresponding task items.

9 Claims, 5 Drawing Sheets

(56) References Cited

U.S. PATENT DOCUMENTS

| | | | | |
|---|---|---|---|---|
| 2010/0138784 | A1* | 6/2010 | Colley | G06F 3/04883 715/810 |
| 2011/0314398 | A1* | 12/2011 | Yano | G06F 9/4443 715/764 |
| 2012/0095979 | A1* | 4/2012 | Aftab | G06F 17/30867 707/706 |
| 2013/0061296 | A1* | 3/2013 | Reddy | H04L 51/02 726/5 |
| 2013/0151666 | A1* | 6/2013 | Hunter | G06Q 30/00 709/219 |
| 2013/0159930 | A1* | 6/2013 | Paretti | G06F 3/048 715/821 |
| 2014/0012974 | A1* | 1/2014 | Studeny | G06F 11/3438 709/224 |
| 2014/0223532 | A1* | 8/2014 | Satoh | H04L 63/0815 726/7 |
| 2014/0237376 | A1* | 8/2014 | Cassano | G06F 9/44 715/744 |
| 2015/0149583 | A1* | 5/2015 | Chung | G06F 17/30029 709/217 |
| 2015/0199442 | A1* | 7/2015 | Hahn | G06F 17/30867 707/751 |
| 2015/0331842 | A1* | 11/2015 | Costa | H04L 29/08 715/202 |

\* cited by examiner

INTEGRATED TASK ITEMS LAUNCHER USER INTERFACE FOR SELECTING AND PRESENTING A SUBSET OF TASK ITEMS BASED ON USER ACTIVITY INFORMATION

BACKGROUND

Field

The present disclosure generally relates to computing devices, and more particularly to a user interface for launching applications on a computing device.

Description of the Related Art

An application launcher is a computer program that helps a user to locate and start other computer programs (e.g., apps) on a computing device. An application launcher provides shortcuts to computer programs typically represented by graphical icons arranged in a graphical user interface displayed in a viewable area of a toolbar positioned on one side of a display screen or in a viewable area of a display screen. However, current application launchers generally are statically arranged and limited to include only apps in the user interface.

SUMMARY

According to one embodiment of the present disclosure, a computer-implemented method is provided. The method includes identifying a plurality of task items associated with a user. The plurality of task items includes a plurality of task types. The method also includes selecting a subset of the plurality of task items based on user activity information. The subset of task items includes at least two different task types. The method also includes providing a launcher user interface for display to the user on a computing device. The launcher user interface includes a plurality of elements corresponding to the selected subset of task items arranged on a single surface. The plurality of elements is selectable to launch respective applications associated with the corresponding task items.

According to one embodiment of the present disclosure, a system is provided. The system includes a memory that includes user activity information, and a processor. The processor is configured to identify a plurality of task items associated with a user. The plurality of task items includes a plurality of task types, the task types including applications, links to networked content, files, and notifications. The processor is further configured to select a subset of the plurality of task items based on user activity information. The subset of task items includes at least two different task types. The processor is also configured to provide a launcher user interface for display to the user on a computing device. The launcher user interface includes a plurality of elements corresponding to the selected subset of task items arranged on a single surface. The plurality of elements is selectable to launch respective applications associated with the corresponding task items.

According to one embodiment of the present disclosure, a non-transitory machine-readable storage medium including machine-readable instructions for causing a processor to execute a method is provided. The method includes identifying a plurality of task items associated with a user. The plurality of task items includes a plurality of task types. The task types include applications, links to networked content, files, and notifications. The method also includes selecting a subset of the plurality of task items based on user activity information obtained from a server over a network or collected locally by a processor of a computing device, and stored locally in a memory of the computing device. The subset of task items includes at least two different task types. The user activity information includes a frequency of a user performing a particular task item, how recently a particular task item was performed, online user history, location of the computing device, operating system and resources of the computing device, and a current time or date. The method also includes providing a launcher user interface for display to the user on the computing device. The launcher user interface includes a plurality of elements corresponding to the selected subset of task items arranged on a single surface. The plurality of elements is selectable to launch respective applications associated with the corresponding task items.

According to one embodiment of the present disclosure, a system is provided. The system includes means for identifying a plurality of task items associated with a user, the plurality of task items including a plurality of task types, and for selecting a subset of the plurality of task items based on user activity information. The subset of task items inc hides at least two different task types. The system also includes means for providing a launcher user interface for display to the user on a computing device. The launcher user interface includes a plurality of elements corresponding to the selected subset of task items arranged on a single surface. The plurality of elements is selectable to launch respective applications associated with the corresponding task items.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

Figure 1:
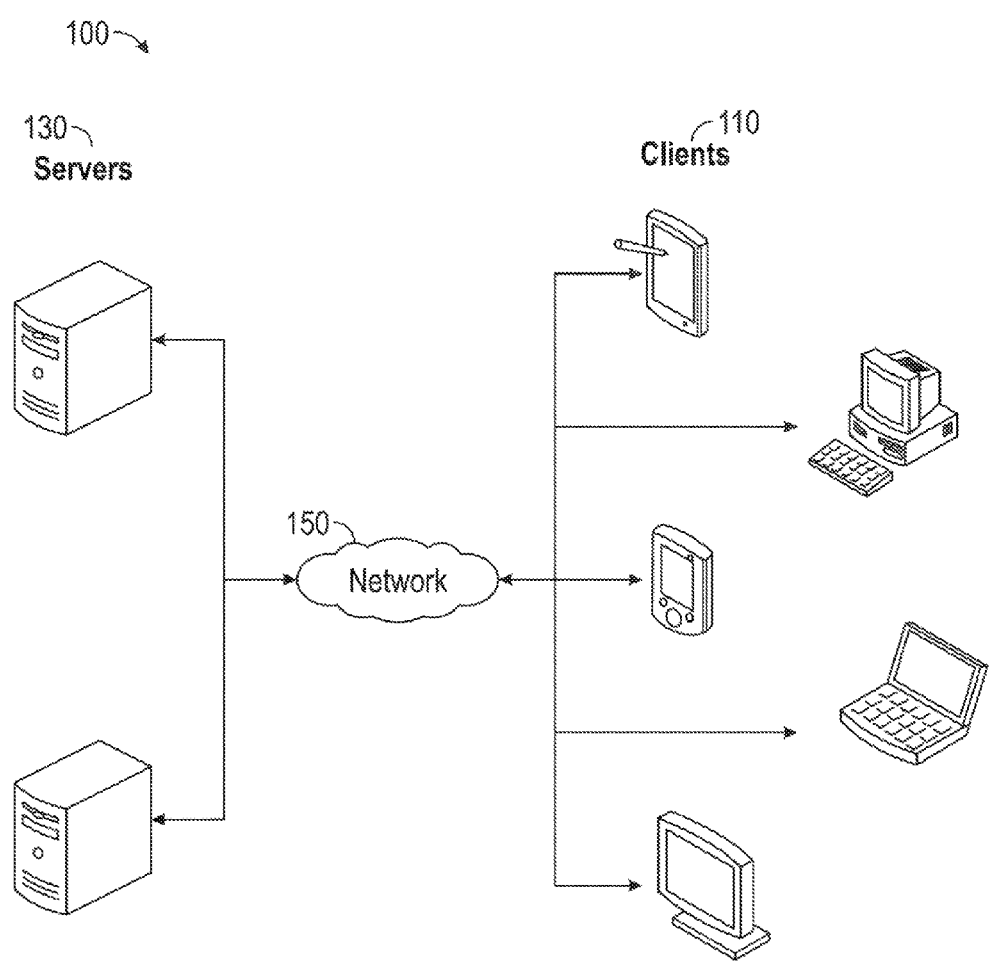
FIG. 1 illustrates an example architecture for providing a launcher interface for task items selected based on user activity.

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

The subject technology provides a launcher that expands the types of tasks that may be started by a user through a launcher beyond applications, and dynamically configures the task items displayed within the launcher based on user activity. As discussed herein, a task item is an item representative of an application to be launched, a file to be opened, or an action or notification to be launched using a corresponding application or file. A task type is the type of application with which the task is associated. For example, task types can be applications, links to networked content, files, or notifications. Task items arranged in the launcher may include apps, online content (e.g., URL), files, notifications (e.g., electronic communications, social networks, online assistants), search interface, etc. The number and order at the task items included in the launcher may be dynamically selected and configured based on user activity such as the frequency of a user performing a particular task item, how recent a particular task item was performed, online user history, location of the computing device, operating system and resources of the computing device, time and date, etc. Each of the task items can be associated with a weighted value that is calculated based on the user activity. The selected task items may be arranged from display to the user in a single surface of a graphical user interface to allow the user to more easily initiate tasks and or resume tasks that are likely to be of interest to the user.

In exemplary aspects, the launcher operates by identifying multiple task items associated with a user, where the task items include multiple task types. The launcher further selects a subset of the identified task items based on user activity, where the subset of task items includes at least two different task types, and provides a launcher user interface for display to the user on a computing device. The subset of task items is selected based on user activity, such as, for example, based on a weighted value that is calculated based on the user activity for each of the task items in order to select a subset that meets a predefined weighting value. The launcher user interface includes elements corresponding to the selected subset of task items arranged on a single surface, where the elements are selectable to launch respective applications associated with the corresponding task items.

The launcher may be cloud-based on a server or locally installed on a computing device. Cloud-based implementations allow consistent launcher user interfaces to be presented to the user regardless of the computing device being used by the user. The launcher may be triggered at startup of the computing device, upon opening a new window or tab within an operating system or browser, upon selecting an icon or soft key within a user interface of a computing device, upon selection of a designated hard key by the user on a computing device, etc.

Although many examples provided herein describe a user's information (e.g., user activity) being stored in memory, each user must grant explicit permission for such user information to be stored. The explicit permission may be granted using privacy controls integrated into the disclosed system. If requested user information includes demographic information, then the demographic information is aggregated on a group basis and not by individual user. Each user is provided notice that such user information will be stored with such explicit consent, and each user may at any time end having the user information stored, and may delete the stored user information. The stored user information may be encrypted to protect user security.

The user can at any time delete the user information from memory and/or opt out of having the user information stored in memory. Additionally, the user can, at any time, adjust appropriate privacy settings to selectively limit the types (If user information stored in memory, or select the memory in which the user information is stored (e.g., locally on the user's device as opposed to remotely a server). In many examples, the user information does not include and/or share the specific identification of the user (e.g., the user's name) unless otherwise specifically provided or directed by the user.

FIG. 1 illustrates an example architecture 100 for providing a launcher interface for task items selected based on user activity. The architecture 100 includes servers 130 and clients 110 connected over a network 150.

The clients 110 can be, for example, desktop computers, mobile computers, wearable computers, tablet computers (e.g., including e-book readers), mobile devices (e.g. a smartphone or PDA), set top boxes (e.g., for a television), video game consoles, or any other devices having appropriate processor, memory, and communications capabilities. The clients 110 can be any device having an appropriate processor and memory capability for providing a launcher interface for task items selected based on user activity. The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

Each of the clients is configured to provide, for display, a launcher interface for launching task items. The task items provided for display in the launcher interface are selected for display in the launcher interface based on user activity. For example, among many different task items, such as applications, links to network files (e.g., links to web pages), media files, documents, messages, online assistants, social networks, or notifications generally, a subset of the task items can be selected for display in the launcher interface because of user activity. For example, the user activity may indicate a user associated with the task item has recently interacted with that particular task item or a similar task item, interacts with the particular task item frequently, the particular task item is relevant based on the current time or date, the operating system or resources have increased the relevance of the task item, a notification has been received for the particular task item, the particular task item is relevant based on a current geolocation of the client 110, or the particular task item has for some reason become particularly active and relevant to engagement with the user.

The user activity information can be collected and stored locally in a memory of the client 110. The user activity information may also be supplemented with user activity information from a server 130 over the network, for example, with user activity information from another client 110 associated with the user uploaded and stored on the server 130 in order to synchronize user activity information for the user in a single or multiple location, namely, single or multiple servers 130. One or many of the servers 130 is configured to host the user activity information. For purposes of load balancing, multiple servers 130 can host the user activity information. The servers 130 can be any device having an appropriate processor, memory, and communications capability for hosting the user activity information.

Figure 2:
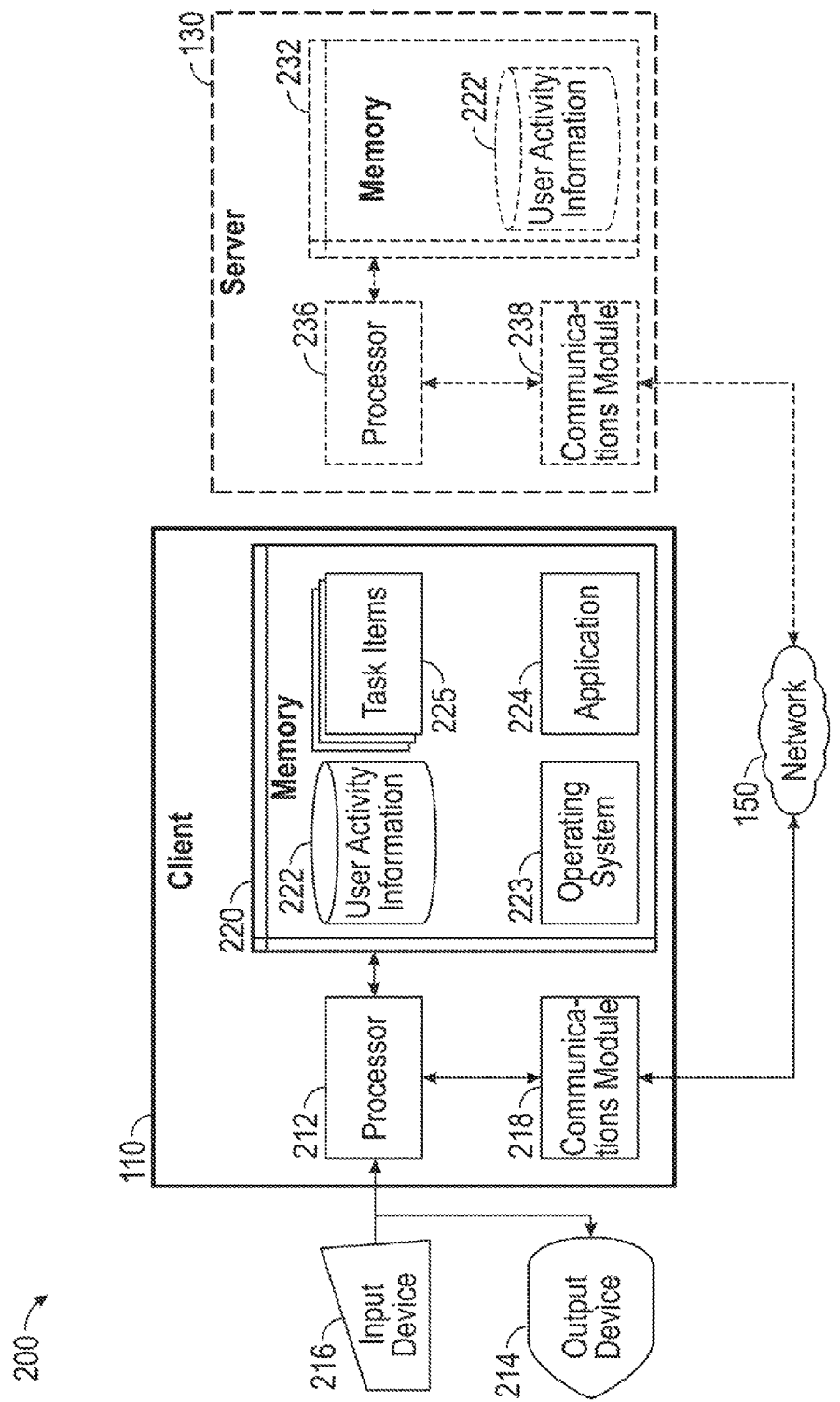
FIG. 2 is a block diagram illustrating an example client and server from the architecture of FIG. 1 according to certain aspects of the disclosure.

FIG. 2 is a block diagram 200 illustrating an example server 130 and client 110 in the architecture 100 of FIG. 1 according to certain aspects of the disclosure. The client 110 and the server 130 are connected over the network 150 via respective communications modules 218 and 238. The communications modules 218 and 238 are configured to interface with the network 150 to send and receive information, such as data, requests, responses, and commands to other devices on the network. The communications modules 218 and 238 can be, for example, modems or Ethernet cards.

The client 110 includes a processor 212, the communications module 218, and a memory 220 that includes an operating system 223, an application 224, and task items 225. The application 224 can be, for example, a web browser or document viewer. The task items 225 can be, for example, applications, links to networked content, files, notifications (e.g., from a personal assistant, messaging application, social network, or other application). The memory 220 also includes user activity information 222. The user activity information 222 can be collected from the application 224 or from the operating system 223. For example, in certain aspects, the user activity information 222 can be collected from the operating system 223 by software running on the operating system that observes, with the authorization of the user, interactions between the user and the operating system 223 (e.g., including with an application 224 installed for the operating system) in order to collect user activity information 222.

The user activity information 222 includes, for example, a frequency of a user performing or otherwise engaging with a particular task item 225, how recently a particular task item 225 was performed, online user history, location of the client 110, operating system and resources of the client 110, and a current time or date. Each of the task items can be associated with a weighted value that is calculated based on the user activity. For example, a weight value may be generated based on certain distinct values associated with each of the frequency of the user performing or otherwise engaging with the particular task item 225, how recently the particular task item 225 was performed, online user history, location of the client 110, operating system and resources of the client 110, and a current time or date. For instance, if an application is particularly resource intensive (e.g., processor or memory intensive), then the application may be given a lower weight value on to client 110 that is a mobile device than a client 110 that is a non-mobile device. As another example, an item may be given a heavier weight if it is interacted with more frequently by a user than another item.

The user activity information 222 can include activity information that is collected locally by the 212 processor of the client 110, for example, as the user uses the application 224 or otherwise interacts with software on the client 110. In certain aspects, the user activity information can also include activity information for the user obtained from a server 130 over the network 150. The server 130 is depicted in phantom in FIG. 3 in order to indicate that access to the server 130 to obtain the user activity information 222' from a processor 236 of the server is optional in that the user activity information 222 can be collected locally by the client 110 without a connection to the server 130 over the network 150. The user activity information 222' on the server 130 can be updated with user activity information 222 for a user uploaded from the client 110, and with user activity information from other clients associated with the user, thereby providing synchronization of user activity information across multiple clients associated with the user.

The client 110 includes an input device 216, such as a touch input, keyboard, or mouse, and an output device 214, such as a display (e.g., touchscreen display). The processor 212 of the client 110 is configured to execute instructions, such as instructions physically coded into the processor 212, instructions received from software in memory 240, or a combination of both. for example, the processor 212 of the client 110 executes instructions to identify task items 225 associated with a user of the client 110. The user can be identified, for example, by providing a user identification to the application 224. The processor 212 of the client 110 is also configured to select a subset of the task items 225 based on the user activity information 222, wherein the subset of the task items 225 includes at least two different task types (e.g., applications, links to networked content, files, or notifications), and provide a launcher user interface for display on the client 110 (e.g., using the output device 214). The launcher user interface can be generated locally by the client 110 or generated by the server 130 and provided to the client 110 over the network 150. The launcher user interface includes a plurality of elements (e.g., icons) corresponding to the selected subset of task items 225 and are arranged on a single surface. The elements are selectable (e.g., using the input device 216) to launch respective applications associated with the corresponding task items. The elements can be ordered for display based on the frequency of the user performing a corresponding task item, how recently the corresponding task item was performed, online user history, location of the computing device, operating system and resources of the computing device, and/or the current time or date.

The launcher user interface can be displayed within the application 224, such as within a new tab page of a web browser. The launcher user interface can also be displayed by an operating system of the client 110, such as within a task bar. As discussed above, the elements corresponding to the selected subset of task items 225 can be synchronized across multiple clients 110 associated with a user, such that the launcher user interface that takes into account user activity information 222 for all of the clients 110 associated with the user can be displayed by an application or by an operating system of any one or all of the clients 110 associated with the user.

In certain aspects, the launcher user interface includes a search interface. The search interface is configured to search the memory of the client 110, or a network of files (e.g., accessible over the network 150) for results response to a query entered into the search interface. For example, the search interface can provide search results from the World Wide Web and search results for files in the memory 220 of the client 110 that are responsive to a query entered into the search interface.

Figure 3:
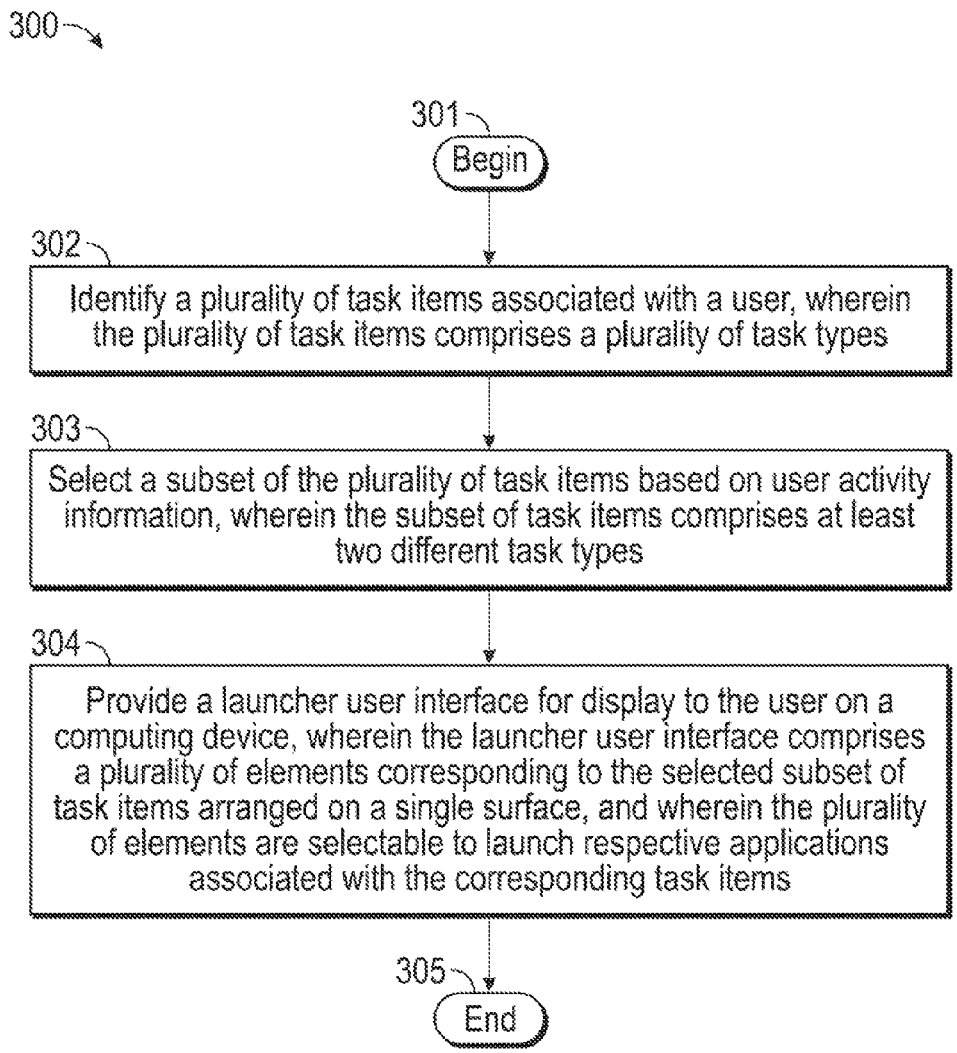
FIG. 3 illustrates an example process for providing a launcher interface for task items selected based on user activity using an example client of FIG. 2.

FIG. 3 illustrates an example process 300 for providing a launcher interface for task items selected based on user activity using the example client 110 of FIG. 2. While FIG. 3 is described with reference to FIG. 2, it should be noted that the process steps of FIG. 3 may be performed by other systems.

The process 300 begins by proceeding from beginning step 301 when, for example, a user identifies himself/herself to the client 110, to step 302 when a plurality of task items 225 associated with a user is identified, the plurality of task items 225 including a plurality of task types. Next, in step 303, a subset of the plurality of task items 225 is selected based on user activity information 222, the subset of task items including at least two different task types. Subsequently, in step 304, a launcher user interface is provided for display to the user on the client 110. The launcher user interface includes a plurality of elements corresponding to the selected subset of task items arranged on a single surface. The plurality of elements is selectable to launch respective applications associated with the corresponding task items. The process 300 then ends in step 305.

FIG. 3 set forth an example process 300 for providing a launcher interface for task items selected based on user activity using the example client 110 and server 130 of FIG. 2. An example will now be described using the example process 300 of FIG. 3, a client 110 that is a desktop computer, and a launcher user interface displayed in an application 224 that is a web browser.

The process 300 begins by proceeding from beginning step 301 when a user identifies himself/herself to the desktop computer 110 to step 302 when a plurality of task items 225 associated with a user is identified. The plurality of task items 225 include a web site for watching videos, an application for sending mass notifications, a maps application, a mail application, multiple notifications for the user from a social network, a notification that an item the user has ordered has shipped, several notifications for the user from a personal assistant application, and various other applications the user has interacted with in the past.

Next, in step 303, the following task items are selected from the plurality of task items 225 because they have the heaviest weighted values from among the plurality of task items 225, the weighted values based on user activity information associated with each of the plurality of task items: the web site for watching videos, the application for sending mass notifications, the maps application, the mail application, and the notification that the item the user has ordered has shipped. The other items, namely the multiple notifications for the user from the social network, the several notifications for the user from the personal assistant application, and the various other applications the user has interacted with in the past, are not selected because they have lighter associated weights than the selected items. For example, these unselected items may, as compared to the selected items, not have been interacted with recently, may be interacted with less frequently, may require more operating system and resources of the desktop computer 110, or may not be relevant to the current geolocation of the desktop computer 110.

Figure 4:
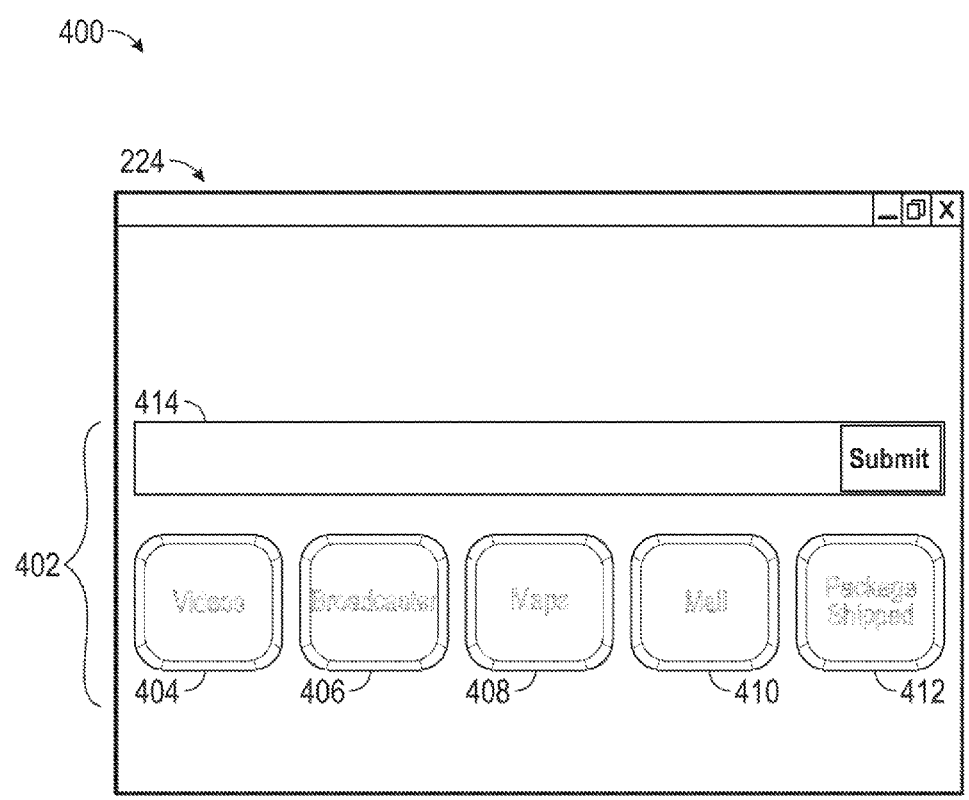
FIG. 4 is an example illustration of a launcher interface for task items selected based on user activity.

Subsequently, in step 304, a launcher user interface is provided for display to the user within a web browser 110 on the desktop computer 110 as illustrated in FIG. 4. FIG. 4 is an example illustration 400 of a launcher user interface 402, displayed within a web browser 224, for task items selected based on user activity. The launcher user interface 402 includes a plurality of elements corresponding to the selected subset of task items that are arranged on a single surface. The elements include an icon 404 for the web site for watching videos, an icon 406 for the application for sending mass notifications, an icon 40$ for the maps application, an icon 410 the mail application, and an icon 412 for the notification that the item the user has ordered has shipped. Each icon for a respective element is selectable to launch respective applications or web pages associated with the corresponding task items. The launcher user interface 402 also includes a search interface 414 configured to search the memory of the desktop computer 110 or the World Wide Web for results response to a query entered into the search interface. The process 300 then ends in step 305.

Figure 5:
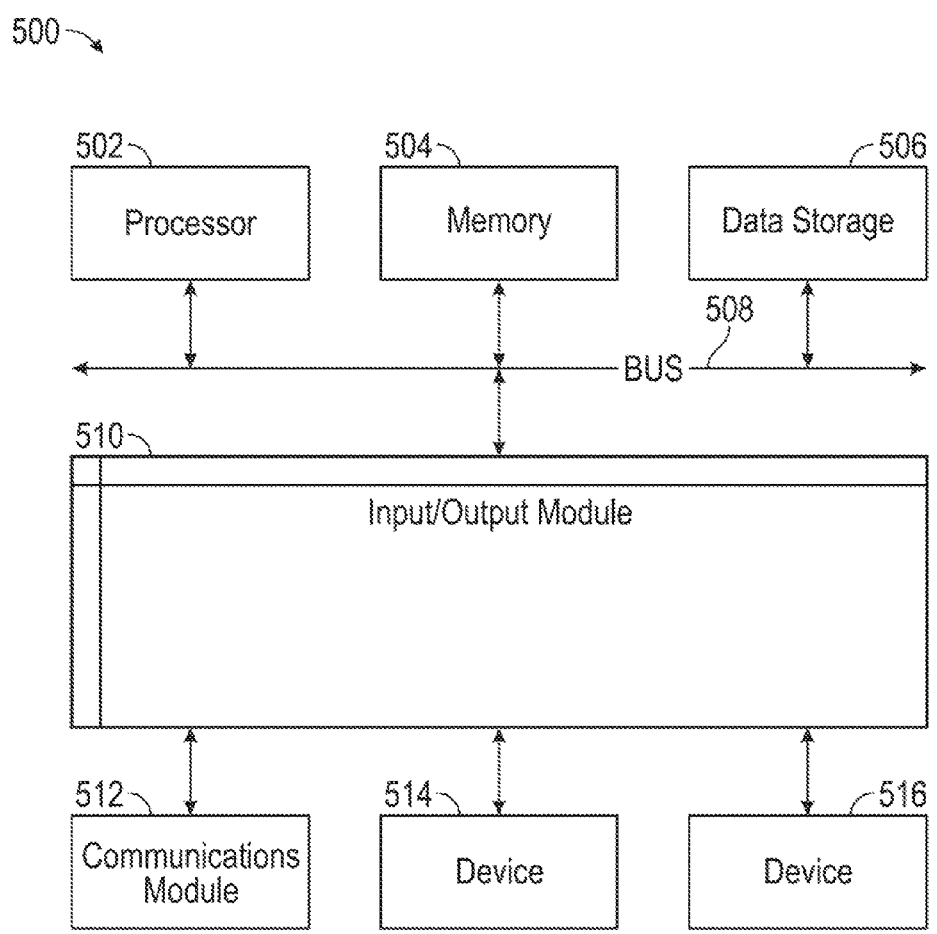
FIG. 5 is a block diagram illustrating an example computer system with which the clients and server of FIG. 2 can be implemented.

FIG. 5 is a block diagram illustrating an example computer system 500 with which the client 110 and server 130 of FIG. 2 can be implemented. In certain aspects, the computer system 500 may be implemented using hardware or a combination of software and hardware, either in a dedicated server, or integrated into another entity, or distributed across multiple entities.

Computer system 500 (e.g., client 110 and server 130) includes a bus 508 or other communication mechanism for communicating information, and a processor 502 (e.g., processor 212 and 236) coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., memory 220 and 232), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, i.e., one or more modules of computer program instructions encoded on a computer readable medium for execution by, or to control the operation of the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Example input/output modules 510 include data ports such as USB ports. The input/output module 510 is configured to connect to a communications module 512. Example communications modules 512 (e.g., communications modules 218 and 238) include networking interface cards, such as Ethernet cards and modems. In certain aspects, the input/output module 510 is configured to connect to a plurality of devices, such as an input device 514 (e.g., input device 216) and/or an output device 516 (e.g., output device 214). Example input devices 514 include a touchscreen, keyboard, or a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 516 include display devices, such as a LED (light emitting diode), CRT (cathode ray tube), or LCD (liquid crystal display) screen, for displaying information to the user.

According to one aspect of the present disclosure, the client 110 and server 130 can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504. causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, an one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computing system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions or data to processor 502 for execution. Such a medium may take many forms, including, but not limited to non-volatile media, volatile media, and transmission media. Non-volatile media include, for example, optical disks, magnetic disks, or flash memory, such as data storage device 506. Volatile media include dynamic memory, such as memory 504. Transmission media include coaxial cables, copper wire, and fiber optics, including the wires that comprise bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A. B, or C" each refer to only A, only B, or only C; any combination of A, B, and C; and/or at least one of each of A, B, and C.

Furthermore, to the extent that the term "include," "have," or the like is used in the description or the claims, such term is intended to be inclusive in a manner similar to the term "comprise" as "comprise" is interpreted when employed as a transitional word in a claim. A reference to an element in the singular is not intended to mean "one and only one" unless specifically stated, but rather "one or more." The term "some" refers to one or more. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above Should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method comprising:
   collecting locally, by a processor of a computing device, user activity information for a user associated with task items, wherein the user activity information comprises one or more of a frequency of a user performing a particular task item, how recently a particular task item was performed, online user history, location of the computing device, operating system and resources of the computing device, and a current time or date;
   supplementing, by the processor of the computing device, the collected user activity information by synchronizing with additional user activity information for the user obtained through a server from another computer device associated with the user;
   storing locally, in a memory of the computing device, the supplemented user activity information associated with the task items;
   identifying, by the processor of the computing device, a plurality of task items associated with the user, wherein the identified plurality of task items includes a plurality of task item types comprising applications, links to networked content, files, and notifications;
   selecting, by the processor of the computing device, a subset of at least two different task item types from the plurality of task item types based on the locally stored user activity information associated with the subset of at least two different task item types;
   displaying, on a display device of the computing device, an integrated task item launcher user interface comprising of a plurality of selectable interface elements representing the selected subset of at least two different task item types in a single surface presentation arrangement to the user, wherein the plurality of selectable interface elements displayed in the integrated task item launcher user interface corresponds to launchable applications associated with the selected subset of at least two different task item types; and
   arranging, by the processor of the computing device, the plurality of selectable interface elements displayed in the integrated task item launcher user interface in a presentation order based on at least one of the frequency of the user performing the particular task item, how recently the corresponding task item was performed, online user history, location of the computing device, operating system and resources of the computing device, and the current time or date.

2. The method of claim 1, wherein the integrated task item launcher user interface comprises a search interface configured to search at least one of a network of files, or the memory of the computing device, for results response to a query entered into the search interface.

3. The method of claim 1, wherein the integrated task item launcher user interface is configured to be provided for display within an application.

4. The method of claim 1, wherein the integrated task item launcher user interface is configured to be provided for display by an operating system.

5. A system comprising:
   a memory; and
   a processor configured to:
   collect locally user activity information for a user associated with task items, wherein the user activity information comprises one or more of a frequency of a user performing a particular task item, how recently a particular task item was performed, online user history, location of the computing device, operating system and resources of a computing device, and a current time or date;
   supplement the collected user activity information by synchronizing with additional user activity information for the user obtained through a server from another computer device associated with the user;
   store locally, in the memory, the supplemented user activity information associated with the task items;
   identify a plurality of task items associated with the user, wherein the identified plurality of task items includes a plurality of task item types, the task item types comprising applications, links to networked content, files, and notifications;
   select a subset of at least two different task item types from the plurality of task item types based on the locally stored user activity information associated with the subset of at least two different task item types;

display, on a display device, an integrated task item launcher user interface comprising of a plurality of selectable interface elements representing the selected subset of at least two different task item types in a single surface presentation arrangement to the user, wherein the plurality of selectable interface elements displayed in the integrated task item launcher user interface corresponds to launchable applications associated with the selected subset of at least two different task item types; and arrange the plurality of selectable interface elements displayed in the integrated task item launcher user interface in a presentation order based on at least one of the frequency of the user performing the particular task item, how recently the corresponding task item was performed, online user history, location of the computing device, operating system and resources of the computing device, and the current time or date.

6. The system of claim 5, wherein the integrated task item launcher user interface comprises a search interface configured to search at least one of a network of files, or memory of the system, for results response to a query entered into the search interface.

7. The system of claim 5, wherein the integrated task item launcher user interface is configured to be provided for display within an application.

8. The system of claim 5, wherein the integrated task item launcher user interface is configured to be provided for display by an operating system.

9. A non-transitory machine-readable storage medium comprising machine-readable instructions for causing a processor to execute a method comprising:

collecting locally, by the processor, user activity information for a user associated with task items, wherein the user activity information comprises one or more of a frequency of a user performing a particular task item, how recently a particular task item was performed, online user history, location of the computing device, operating system and resources of a computing device, and a current time or date;

supplementing, by the processor, the collected user activity information by synchronizing with additional user activity information for the user obtained through a server from another computer device associated with the user;

storing locally, in a memory, the supplemented user activity information associated with the task items;

identifying, by the processor, a plurality of task items associated with the user, wherein the identified plurality of task items includes a plurality of task item types comprising applications, links to networked content, files, and notifications;

selecting, by the processor, a subset of at least two different task item types from the plurality of task item types based on the locally stored user activity information associated with the subset of at least two different task item types;

displaying, on a display device, an integrated task item launcher user interface comprising of a plurality of selectable interface elements representing the selected subset of at least two different task item types in a single surface presentation arrangement to the user, wherein the plurality of selectable interface elements displayed in the integrated task item launcher user interface corresponds to launchable applications associated with the selected subset of at least two different task item types; and arranging, by the processor, the plurality of selectable interface elements displayed in the integrated task item launcher user interface in a presentation order based on at least one of the frequency of the user performing the particular task item, how recently the corresponding task item was performed, online user history, location of the computing device, operating system and resources of the computing device, and the current time or date.

* * * * *